United States Patent
Zhu et al.

(10) Patent No.: US 7,359,035 B2
(45) Date of Patent: Apr. 15, 2008

(54) DIGITAL EXPOSURE APPARATUS FOR A COLOR ENLARGING PHOTOPRINTER

(75) Inventors: Zongxi Zhu, Shanghai (CN); Ruping Zhu, Shanghai (CN); Zongshen Zhu, Shanghai (CN); Yunxiang Chen, Shanghai (CN); Aiping Yang, Shanghai (CN); Yi Zhu, Shanghai (CN)

(73) Assignee: Shanghai Liebold Technology Ltd. Co., Shanghai (CN)

( * ) Notice: Subject to any disclaimer, the term of this patent is extended or adjusted under 35 U.S.C. 154(b) by 361 days.

(21) Appl. No.: 10/999,368

(22) Filed: Nov. 30, 2004

(65) Prior Publication Data

US 2005/0157277 A1    Jul. 21, 2005

Related U.S. Application Data

(63) Continuation of application No. PCT/CN02/00450, filed on Jun. 28, 2002.

(30) Foreign Application Priority Data

Jun. 5, 2002    (CN) ................ 02217941.0

(51) Int. Cl.
G03B 27/54    (2006.01)
(52) U.S. Cl. .................... 355/67; 355/70; 355/71
(58) Field of Classification Search ................ 355/20, 355/7, 67–71
See application file for complete search history.

(56) References Cited

U.S. PATENT DOCUMENTS

| 5,400,152 A | 3/1995 | Manico et al. |
| 5,801,812 A | 9/1998 | Lo et al. |
| 5,801,814 A | 9/1998 | Matsumoto |
| 6,020,948 A | 2/2000 | Tumidei |
| 2006/0098451 A1* | 5/2006 | Hsu et al. ............ 362/555 |

FOREIGN PATENT DOCUMENTS

| CN | 1215848 A | 5/1999 |
| CN | 1260512 A | 7/2000 |
| CN | 2415373 Y | 7/2001 |
| EP | 0 646 828 A1 | 4/1995 |
| EP | 0 915 384 A2 | 5/1999 |
| EP | 1 011 041 A2 | 6/2000 |
| EP | 1 046 948 A1 | 10/2000 |
| JP | 4347848 | 12/1992 |
| JP | 2000180982 | 6/2000 |

* cited by examiner

Primary Examiner—D. Rutledge
(74) Attorney, Agent, or Firm—Dorsey & Whitney LLP

(57) ABSTRACT

A digital exposure apparatus for a color enlarging photo printer is disclosed, in which an exposure unit comprising a Liquid Crystal on Silicon, a polarization splitting prism, a condenser lens, a light source, and a digital enlarging objecting lens, wherein the optical axis of the Liquid Crystal on Silicon, the polarization splitting prism and the digital enlarging objective lens coincides with the optical axis of the printing lamp, the filter and the mixed light barrel. The whole structure of this apparatus is simplified and the light intensity of existing digital exposure apparatus is increased. The technology is advanced so that the digital exposure apparatus will be more productive.

4 Claims, 3 Drawing Sheets

DIGITAL EXPOSURE APPARATUS FOR A COLOR ENLARGING PHOTOPRINTER

CROSS-REFERENCE TO RELATED APPLICATION(S)

This application is a continuation of International Patent Application No. PCT/CN02/00450, filed on Jun. 28, 2002, which claims priority to Chinese Patent Application No. 02217941.0, filed on Jun. 5, 2002, the contents of both are incorporated herein by reference in their entirety.

TECHNICAL FIELD

This invention relates to a digital exposure apparatus used on a color enlarging photo printer.

BACKGROUND TECHNOLOGY

The traditional production procedure of the color enlarging photo printer is: Put the color negative film into the carrier, the light provided by the light source and the mixed light barrel passes through the color negative film, the enlarging objective lens and forms images on the printing paper. Because the color ingredient on the film is different and the light is corrected by the color filters, the color former on the printing paper receives different light exposure and becomes latent images. The auto-printing equipment will print printing papers to certain amount, which are sent into the processing equipment to react fully with the developer in developer liquid tank, the fixative in fixative liquid tank and the stabilizing bath in the stabilization tank, to finish such procedures as developing, fixing and stabilizing. The printing papers are dried and cut automatically to get vivid color photos.

The work process of the traditional color enlarging photo printer has existed for a long time. In China, thousands of such equipments are distributed all over the country. In these years, with the development of digital technology, the traditional film photography is being replaced gradually by the digital photography technology for its shortcomings such as high cost, unable to see the quality of the photos immediately and so on.

An existing digital exposure apparatus is shown in FIG. 1. The digital exposure apparatus replaces the negative film carrier on the color enlarging photo printer, being fixed on the color enlarging photo printer in the same matter as the negative film carrier. The color enlarging photo printer can be used to print traditional films and digital images. The digital images can be corrected or edited using computer, displayed by Liquid Crystal on Silicon and projected onto the printing paper to exposure and get the digital photos. The inherent color enlarging photo printer has been provided with more functions.

The digital exposure apparatus comprises: a printing lamp 11, a filters 12, a mixed light barrel 13, an exposure component 14, a shutter 15; the exposure component 14 comprises: a polarization splitting prism 141, a second enlarging lens 142, a Liquid Crystal on Silicon 143, an enlarging lens 144, a light source 145, a first reflective mirror 146, a second reflective mirror 147, a third reflective mirror 148, a second shutter 149. The light source 145 comprises: a halogen lamp 1451, a heat absorbing glass 1452, a falling color temperature reduction glass 1453, a mixed light barrel 454, a second filter 1455, a condenser lens 1456. The printing lamp irradiates light to pass through the heat absorbing glass and the falling color temperature reduction glass into the mixed light barrel to uniform the light; the red, green, and blue color lights are produced while passing through the second filter; the condenser lens magnifies the facula, uniformly irradiates the light onto the polarization splitting prism; which reflects the three-color images engendered by the Liquid Crystal on Silicon, the enlarging objective lens magnifies the images; the first, second and third reflective mirrors reflect the light and to images at the negative position, which are in the size of the traditional 135 color film. The enlarging objective lens magnifies the image. At last, the color photos are formed on the printing paper 16. Since the digital exposure apparatus replaces the initial negative carrier, the position of the digital image displayed by the chip will be at the place where the color negative film is, meaning that it can be treated as a negative. For this reason, the imaging sources can be expanded to the digital images of disks, digital cameras, not only the color negative films as before. Combined with other functions of the color enlarging photo printer, this apparatus can be used both in film printing and digital printing. It is devised to acclimate with the today's trend in photography and promotes the development of photography. But in this apparatus, there are too many reflective mirrors, the optical axis of the second enlarging lens and the enlarging objective lens can not be adjusted easily, especially doing installation at the printing house. Also because there are too many lenses composed by the second enlarging objective lens and the enlarging objective lens, the light intensity radiated by the printing lamp loses a lot due to the absorption of the glasses, the exposure time is prolonged and the velocity is affected.

SUMMARY OF THE INVENTION

The present invention is provided to overcome the shortcomings of existing digital exposure apparatus. It increases the light intensity of existing digital exposure apparatus, advances the technology and makes the digital exposure apparatus more productive.

According to the present invention, providing a digital exposure apparatus for a color enlarging photo printer, comprising: a printing lamp; a filter disposed in line with the printing lamp; a mixed light barrel disposed in line with the filter; a shutter disposed in line with the mixed light barrel; an exposure unit disposed in line between the mixed light barrel and the shutter, wherein the exposure unit comprises: a liquid crystal on silicon disposed at a position of a negative lens film of the color enlarging photo printer; a polarization splitter disposed in line with the liquid crystal on silicon; a condenser lens, disposed perpendicular in line and adjacent to the polarization splitter; a light source, disposed in line with the condenser lens and polarization splitter; and a digital enlarging objective lens disposed in line with the polarization splitter between the polarization splitter and the shutter; wherein an optical axis of the liquid crystal on silicon, the polarization splitter, and the digital enlarging objective lens aligns with an optical axis of the printing lamp, the filter, and the mixed light barrel.

According to an embodiment, the light source is composed of LED, arranged at the outside of the condenser lens.

According to an embodiment, the light source is composed of a second shutter, a condenser lens, a color temperature reduction glass, a tricolor wheel, a second mixed light barrel, an anti-ultraviolet glass, a heat absorbing glass and a halogen lamp, sequentially arranged outside of the condenser lens; wherein the optical axis of the light source is perpendicular to the optical axis composed by the Liquid Crystal on Silicon, the polarization splitting prism, the digital enlarging objective lens, the printing lamp, the filter and the mixed light barrel.

According to an embodiment, the volume of the second mixed light barrel is smaller than that of the mixed light barrel.

BRIEF DESCRIPTION OF THE DRAWINGS

The specific structure of this invention is given from the examples and the figs listed below.

EOMBODIMENTS

Figure 1:
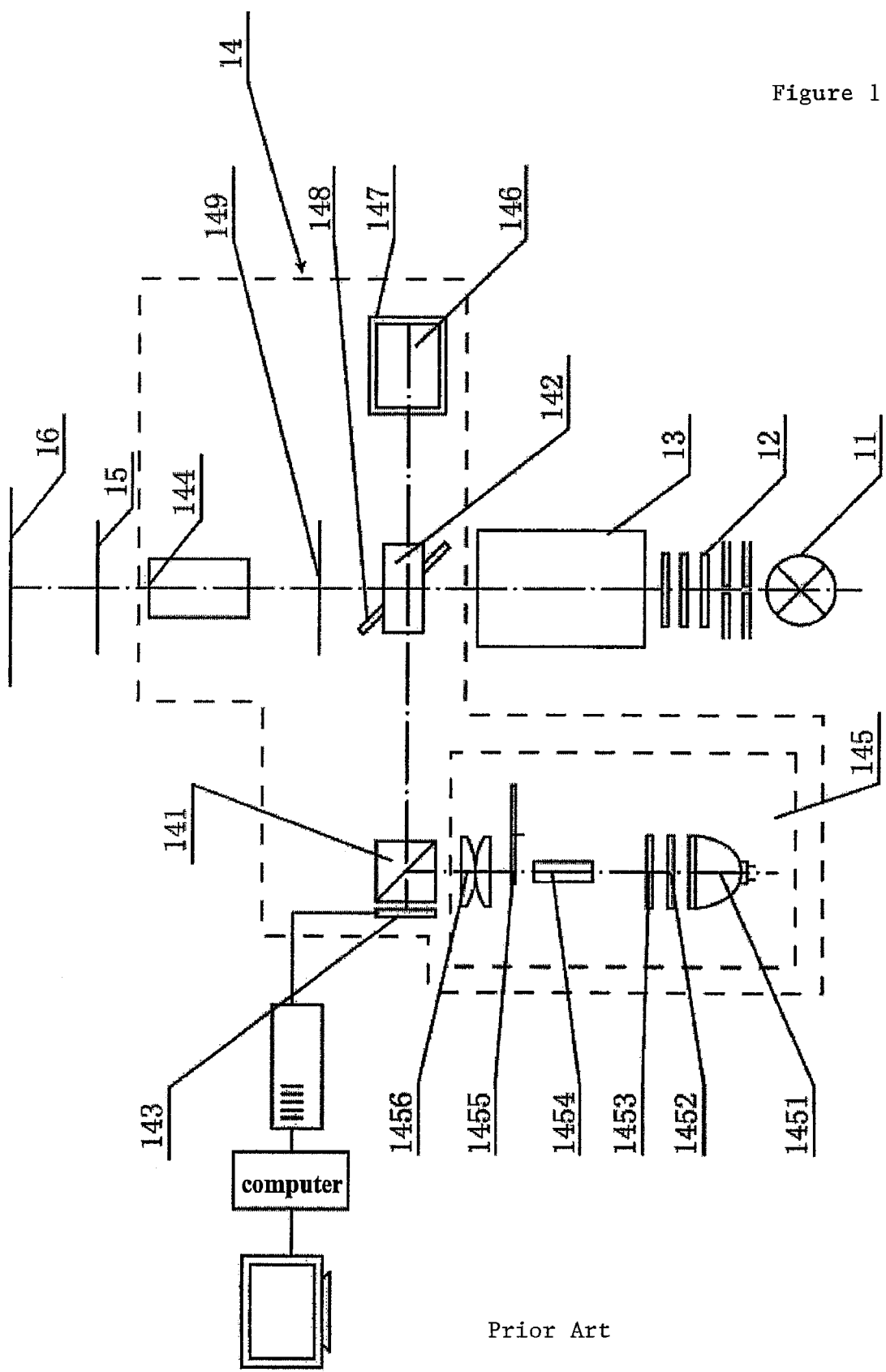
FIG. 1 is the structural representation of the existing digital exposure apparatus.
Figure 2:
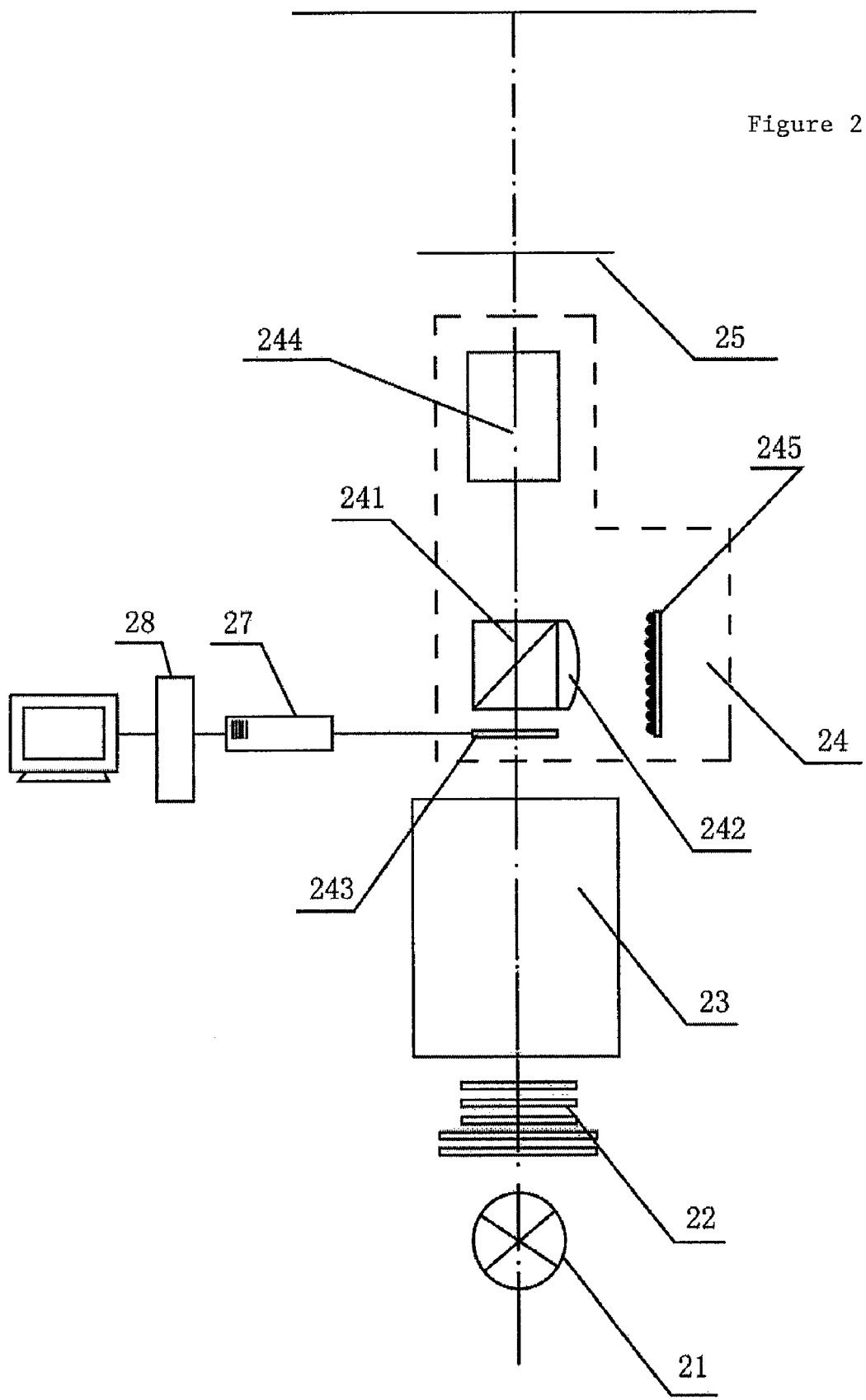
FIG. 2 is the structural representation of the first application example of this digital exposure apparatus.

With reference to FIG. 2, a digital exposure apparatus for a color enlarging photo printer, comprising: a printing lamp 21, a filter 22, a mixed light barrel 23, an exposure unit 24, a shutter 25; the exposure unit 24 comprised: a polarization splitting prism 241, a condenser lens 242, a Liquid Crystal on Silicon 243, a digital enlarging objective lens 244 and light source 245. The Liquid Crystal on Silicon 243 is arranged at the same position of the negative film of the traditional color enlarging photo printer, the Liquid Crystal on Silicon 243 is connected to a computer 28 with the serial-port of control panel 27. A polarization splitting prism 241 is arranged above the Liquid Crystal on Silicon 243. A condenser lens 242 is arranged close to the outside of the polarization splitting prism 241. A light source 245 is arranged close to the outside of the condenser lens 242. The light source 245, which can radiate red, green and blue color lights, is composed of three types of LEDs, which are red, green and blue LEDs. The light source is positioned at the outside of the condenser lens 242. The digital enlarging objective lens 244 is arranged above the polarization splitting prism 241; the optical axis of the Liquid Crystal on Silicon 243, the polarization splitting prism 241, the digital enlarging objective lens 244 coincides with the optical axis of the printing lamp 21, the filters 22 and the mixed light barrel 23.

All of the components are fixed by the corresponding fixed seats inside of the casinge.

The working process of the digital exposure apparatus: When the Liquid Crystal on Silicon displays one red color image, the LED light source lightens the red LED at the same time; once the exposure ends, the LED red LED blacks out. So are the situations of blue, green color images. Then, the functions of the halogen lamp, the tricolor wheel and the shutter in the digital exposure apparatus can be replaced.

The advantages of the LED light source are that it can avoid the mechanical misoperations of the shutter and the tricolor wheel. The quality of the images will be stable and reliable.

Figure 3:
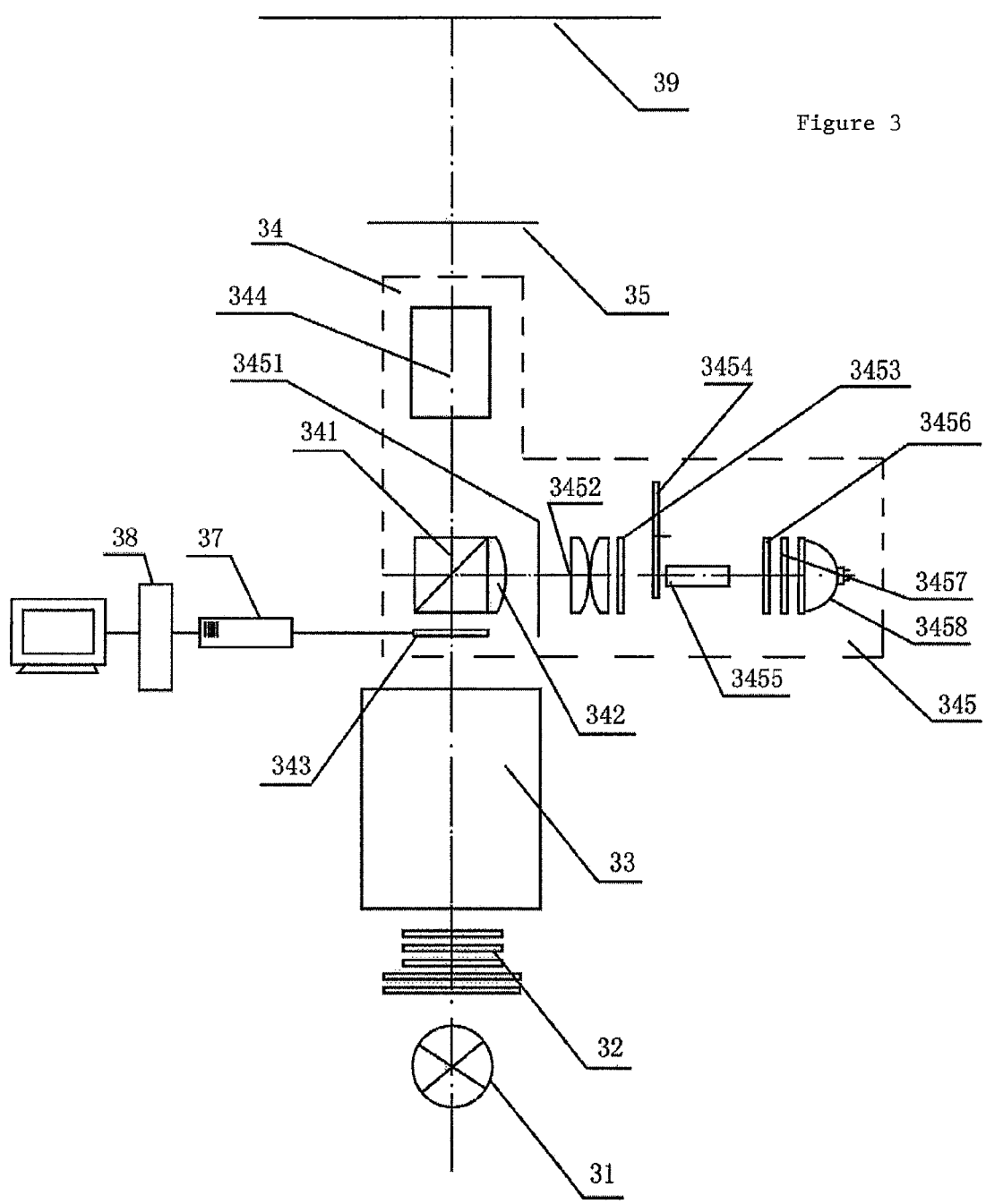
FIG. 3 is the structural representation of the second application example of this digital exposure apparatus.

With reference to FIG. 3, the present invention provides the following components: a printing lamp 31, a filter 32, a mixed light barrel 33, an exposure unit 34, a shutter 35; the exposure unit 34 comprises: a polarization splitting prism 341, a condenser lens 342, a Liquid Crystal on Silicon 343, a digital enlarging objective lens 344 and a light source 345. The Liquid Crystal on Silicon 343 is positioned at the same position of the negative film of on the traditional color enlarging photo printer, the Liquid Crystal on Silicon 343 is connected to a computer 38 with serial-port of control panel 37. The polarization splitting prism 341 is arranged above the Liquid Crystal on Silicon 343. The condenser lens 342 is positioned outside of the polarization splitting prism 341. And the light source 345 is set outside of the condenser lens 342. The light source 345 is composed of a second shutter 3451, a condenser lens 3452, a color temperature reduction glass 3453, a tricolor wheel 3454, a second mixed light barrel 3455, an anti-ultraviolet glass 3456, a heat absorbing glass 3457, and a halogen lamp 3458. These components are arranged sequentially outside of the condenser lens. The optical axis of the light source is perpendicular to the optical axis composed by the Liquid Crystal on Silicon, the polarization splitting prism, the digital enlarging objective lens, the printing lamp, the filters and the light tunnel.

All the components are fixed in the casing by the corresponding fixed bearing.

The working principle of the apparatus is: by adding the color temperature reduction glass into the independent light source combination, the color temperature of the light is more applicable for the Liquid Crystal on Silicon to image on the printing paper 39. The mixed light barrel's size is smaller than that of its counterpart on the color enlarging photo printer, which will reduce the area of the color filter greatly, so the on-off inertia is also reduced and make the light source more homogeneous as well. Using the imaging principle of the additive color method, the color filter of the three primary colors will make the picture more vivid. Because the size of the mixed light barrel is small, the transmitted facula is also small. With the condenser lens added to the system, the required exposure area of the Liquid Crystal on Silicon is enlarged, and this will make full use of the light energy. The second shutter is used to control the exposure time and to prevent the parasitic light.

The light radiated by the second light source becomes polarized light after the 45° oblique reflection through the polarized spectroscope and then reaches the Liquid Crystal on Silicon. The microcrystals of the Liquid Crystal on Silicon, which control the image, become well-regulated crystals parallel to the chip plane on account of the effect of voltage. The S polarized light enters vertically into the plane of the Liquid Crystal on Silicon and will be reflected vertically out of the crystals which parallel with the plane of the chip and become the P polarized light. The P polarized light enters into the polarized spectroscope and is analyzed by the polarized spectroscope, thus making the light reflected by the microcrystal transits through the prism. At the same time, the random light will be ended because the directions are different. Then one image of high articulation and high contrast will be obtained. With the objective lens, the image engendered by the Liquid Crystal on Silicon will expose on the printing paper. Since the Liquid Crystal on Silicon is a monocolor apparatus, with this invention, one digital photo will be obtained after exposure three times, to the red, green, and blue color respectively.

INDUSTRIAL APPLICATION

Since the structure mentioned above is adopted, the first, second, third reflecting mirror and the second objective lens of the existing exposure equipment are wiped off. The whole structure is simplified. But most important, it will increase the efficient light intensity and enhance the assembly technique.

The invention claimed is:

1. A digital exposure apparatus for a color enlarging photo printer, comprising:

a printing lamp;
a filter disposed in line with the printing lamp;
a mixed light barrel disposed in line with the filter;
a shutter disposed in line with the mixed light barrel;
an exposure unit disposed in line between the mixed light barrel and the shutter, wherein the exposure unit comprises:
a liquid crystal on silicon disposed at a position of a negative lens film of the color enlarging photo printer;
a polarization splitter disposed in line with the liquid crystal on silicon;
a condenser lens, disposed perpendicular in line and adjacent to the polarization splitter;
a light source, disposed in line with the condenser lens and polarization splitter; and
a digital enlarging objective lens disposed in line with the polarization splitter between the polarization splitter and the shutter;
wherein an optical axis of the liquid crystal on silicon, the polarization splitter, and the digital enlarging objective lens aligns with an optical axis of the printing lamp, the filter, and the mixed light barrel.

2. The digital exposure apparatus of claim 1, wherein the light source includes a LED.

3. The digital exposure apparatus of claim 1, wherein the light source includes a second shutter, a second condenser lens, a color temperature reduction glass, a tricolor wheel, a second mixed light barrel, an anti-ultraviolet glass, a heat absorbing glass and a halogen lamp, disposed in line and outside of the first condenser lens, and wherein an optical axis of the light source is perpendicular to the optical axis of the polarization splitter, the digital enlarging objective lens, the printing lamp, the filter, and the mixed light barrel.

4. The digital exposure apparatus of claim 3, wherein a volume of the second mixed light barrel is smaller than a volume of the first mixed light barrel.

* * * * *